(12) United States Patent
Cummings

(10) Patent No.: US 9,037,409 B2
(45) Date of Patent: May 19, 2015

(54) NAVIGATOR DATABASE SEARCH METHODS

(76) Inventor: Ian Cummings, Ypsilanti, MI (US)

( * ) Notice: Subject to any disclaimer, the term of this patent is extended or adjusted under 35 U.S.C. 154(b) by 1770 days.

(21) Appl. No.: 12/115,315

(22) Filed: May 5, 2008

(65) Prior Publication Data

US 2008/0275875 A1   Nov. 6, 2008

Related U.S. Application Data

(60) Provisional application No. 60/916,130, filed on May 4, 2007.

(51) Int. Cl.
G01C 21/34 (2006.01)
G08G 1/123 (2006.01)
G01C 21/36 (2006.01)
G06F 17/30 (2006.01)

(52) U.S. Cl.
CPC ........ *G01C 21/3682* (2013.01); *G01C 21/3679* (2013.01); *G06F 17/30241* (2013.01)

(58) Field of Classification Search
None
See application file for complete search history.

(56) References Cited

U.S. PATENT DOCUMENTS

| | | | |
|---|---|---|---|
| 5,852,810 A * | 12/1998 | Sotiroff et al. | 705/27 |
| 5,938,720 A * | 8/1999 | Tamai | 701/209 |
| 6,070,122 A | 5/2000 | Ishida et al. | |
| 6,107,944 A | 8/2000 | Behr et al. | |
| 6,263,278 B1 * | 7/2001 | Nikiel et al. | 701/533 |
| 6,347,278 B2 | 2/2002 | Ito et al. | |
| 6,415,227 B1 * | 7/2002 | Lin | 701/213 |
| 6,650,998 B1 * | 11/2003 | Rutledge et al. | 701/211 |
| 7,672,778 B1 * | 3/2010 | Elliott | 701/209 |
| 2001/0025223 A1 * | 9/2001 | Geiger et al. | 701/211 |
| 2003/0158658 A1 * | 8/2003 | Hoever et al. | 701/209 |
| 2004/0128064 A1 * | 7/2004 | Lueer et al. | 701/201 |
| 2005/0065713 A1 * | 3/2005 | Yamada et al. | 701/200 |
| 2005/0270311 A1 * | 12/2005 | Rasmussen et al. | 345/677 |
| 2006/0058958 A1 * | 3/2006 | Galbreath et al. | 701/214 |
| 2007/0080830 A1 * | 4/2007 | Sacks | 340/995.1 |

* cited by examiner

*Primary Examiner* — Augustine K Obisesan
(74) *Attorney, Agent, or Firm* — Gifford, Krass, Sprinkle, Anderson & Citkowski, P.C.

(57) ABSTRACT

Methods and associated apparatus allow a vehicle navigator to more efficiently search for locations in a database. According to one such method, a map is divided into tiles, and locations are associated within each tile with the tile the user is in. When queried by a user for a location, the system checks the tile currently occupied by the user to determine if it contains any of the desired locations. The system then checks the tile(s) adjacent to the currently occupied tile to determine if it contains any of the desired locations. The system then checks the tile(s) adjacent to b) to determine if it contains any of the desired locations, and the process is repeated, as necessary, until all tiles adjacent to tiles that have been checked are themselves checked that are to determine if locations matching the query are present. The position of the location (s) can then be communicated to the user. Alternative methods and system-level aspects of the invention are also disclosed.

2 Claims, 8 Drawing Sheets

Location list

Location A

Location list

Location A

Location list
Location A
Location B
Location C
Location D

Location list
Location A
Location B
Location C
Location D
Location E
Location F

Location G
Location H
Location I
Location J
Location K
Location L

NAVIGATOR DATABASE SEARCH METHODS

REFERENCE TO RELATED APPLICATION

This application claims priority from U.S. Provisional Patent Application Ser. No. 60/916,130, filed May 4, 2007, the entire content of which is incorporated herein by reference.

FIELD OF THE INVENTION

This invention relates generally to vehicle navigation and, in particular, to methods and associated apparatus allowing a navigator to more efficiently search for locations in a database.

BACKGROUND OF THE INVENTION

A navigator is a device which provides guidance to a user as to how to travel from place to place. The guidance may include a map display, visual text instructions, or audible instructions.

In a wireless client-server (WCS) navigator, route searches and map generation are performed at a central location and transmitted to mobile units. The central server manages databases of geographical information and, in response to requests from the mobile clients, guidance in the form of maps, routes, and/or instructions are downloaded.

The engineering and business requirements of WCS navigation differ somewhat from those of standard standalone navigators. One major difference is that for WCS navigators, data transmission costs are a large part of the ongoing cost of operating the system. In order to economically provide WCS navigation, it is important to minimize the amount of data transmitted while still meeting customers' navigation needs.

SUMMARY OF THE INVENTION

This invention is directed to methods and associated apparatus allowing a vehicle navigator to more efficiently search for locations in a database. According to one such method, a map is divided into tiles, and locations are associated within each tile with the tile the user is in. When queried by a user for a location, the system checks the tile currently occupied by the user to determine if it contains any of the desired locations. The system then checks the tile(s) adjacent to the currently occupied tile to determine if it contains any of the desired locations. The system then checks the tile(s) adjacent to the already checked tile(s) to determine if it contains any of the desired locations, and the process is repeated, as necessary, until all tiles adjacent to tiles that have been checked are themselves checked to determine if locations matching the query are present. The position of the location(s) can then be communicated to the user.

In the case of a unique location, the search ends when the desired location has been found. In the case of a class of locations, the search ends when the number of matching locations found meets or exceeds a predetermined number.

A method of providing guidance with a wireless client-server navigation system, comprising the steps of:

receiving, at a mobile client, criteria associated with a desired location;

transmitting data representative of the criteria to a central server;

searching a database at the server for locations matching the criteria;

transmitting data associated with found locations matching the criteria from the central server to the mobile client, including map data of a vicinity proximate to the found locations;

presenting at the mobile client representations of the found locations and associated data;

selecting one of the found locations at the mobile client; and providing guidance to the mobile client in the form of a moving map display showing the location of the mobile client, the location of the selected location, and guidance for traveling to the selected location.

The location of the mobile client is preferably updated on a real-time basis. The data associated with the found locations may include contact information. Representations of additional distance or travel time required to add a found location to the user's current route may be provided. The user's current route may be amended to include the selected location. System-level aspects of the invention as also described and claimed.

DETAILED DESCRIPTION OF THE INVENTION

This invention resides in methods and associated apparatus allowing a navigator to efficiently search for locations in a database. The locations may be unique locations, for example a particular person's home, or they may be a class of locations, such as fast food restaurants, gas stations, stores, points of interest, or any other desirable destination(s).

According to the invention a map is divided into tiles. A database of locations is then divided up so that locations within each tile of the map are associated with that tile. When the navigator is queried as to the position of a location, the navigator first checks to see if a location matching the query is within a particular tile, which may or may not be the tile currently occupied by the navigator. The navigator then checks the tiles adjacent to the first tile to see if locations matching the query are present.

This process is continued until the navigator checks all tiles that have not yet been checked that are adjacent to tiles that have been checked to see if locations matching the query are present. In the case of a unique location, the search ends when the desired location has been found. In the case of a class of locations, the search ends when the number of matching locations found meets or exceeds a predetermined number. The position of one or more of the locations is then communicated to a user.

This process can be performed iteratively with tiles of varying sizes going either from smaller to larger tiles, or larger to smaller. Additional information may be associated with the locations in the database. For example, the location may be associated with a name and phone number.

Figure 1:
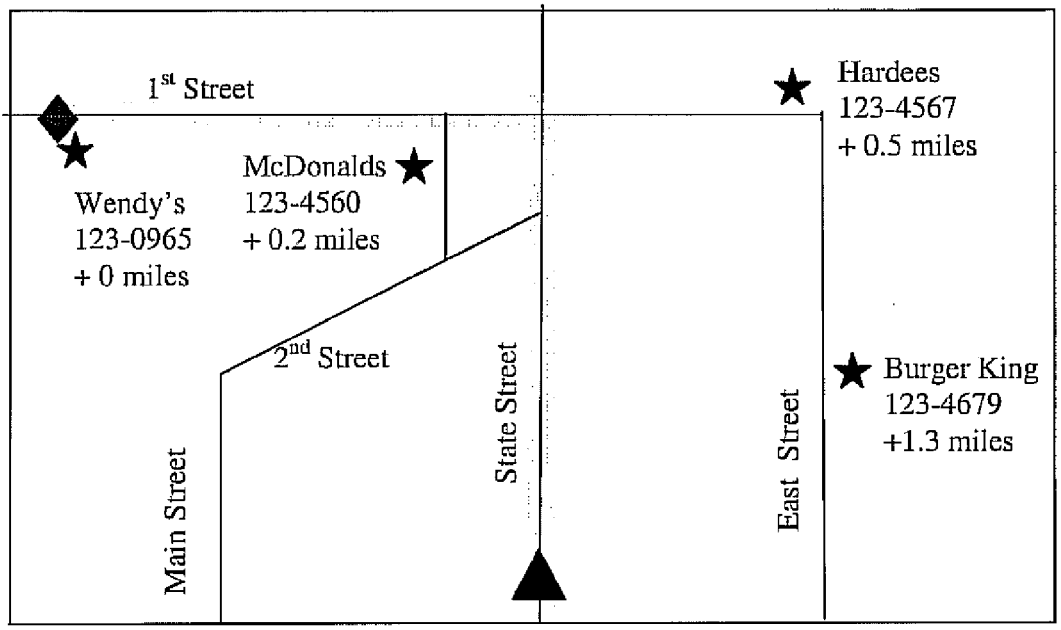
FIG. 1 is a depiction of a navigator displaying additional route distances if displayed locations are added to the current route.
Figure 2:
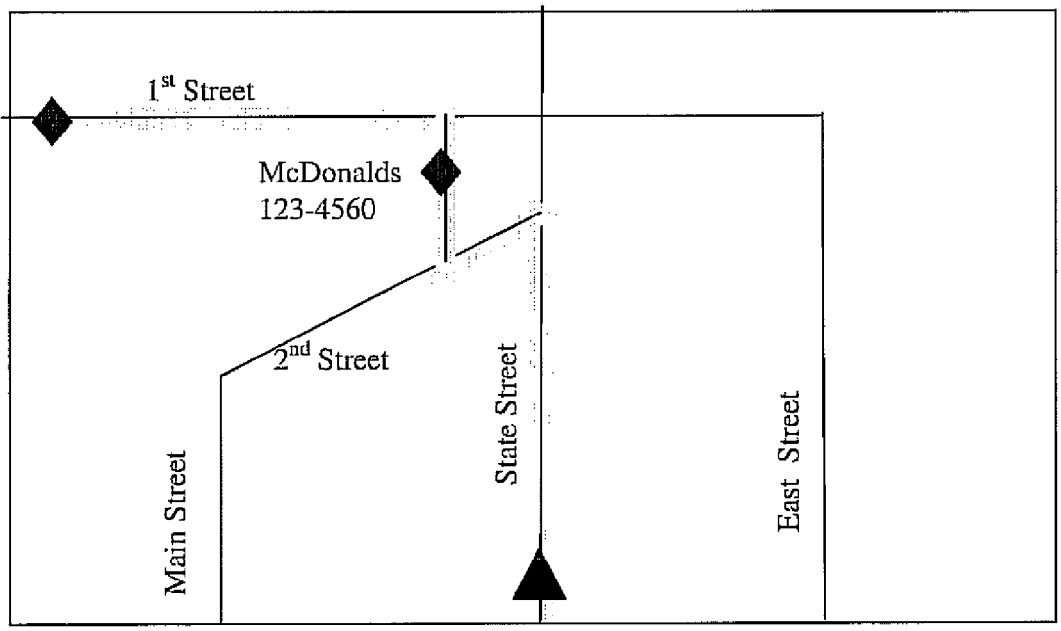
FIG. 2 shows a route updated to include a new destination.
Figure 3:
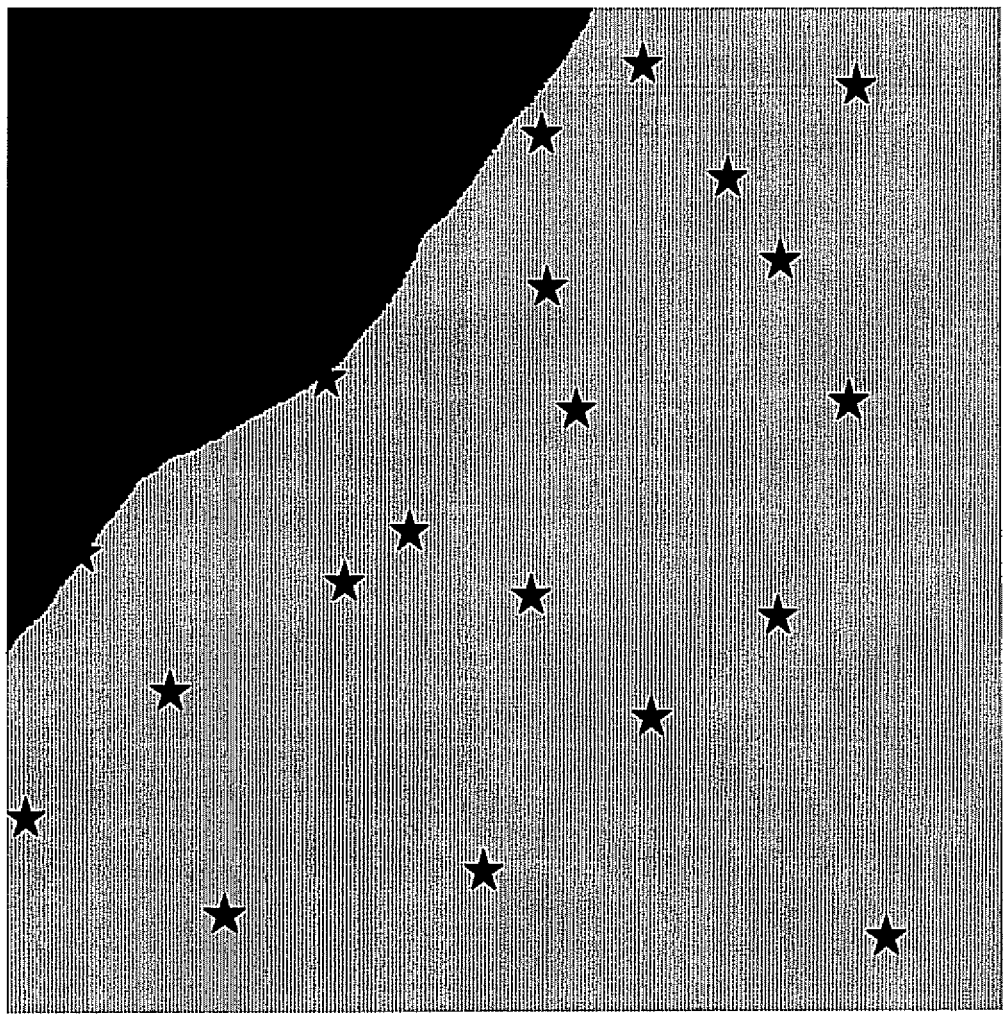
FIG. 3 shows a map and a set of locations matching search criteria.
Figure 4:
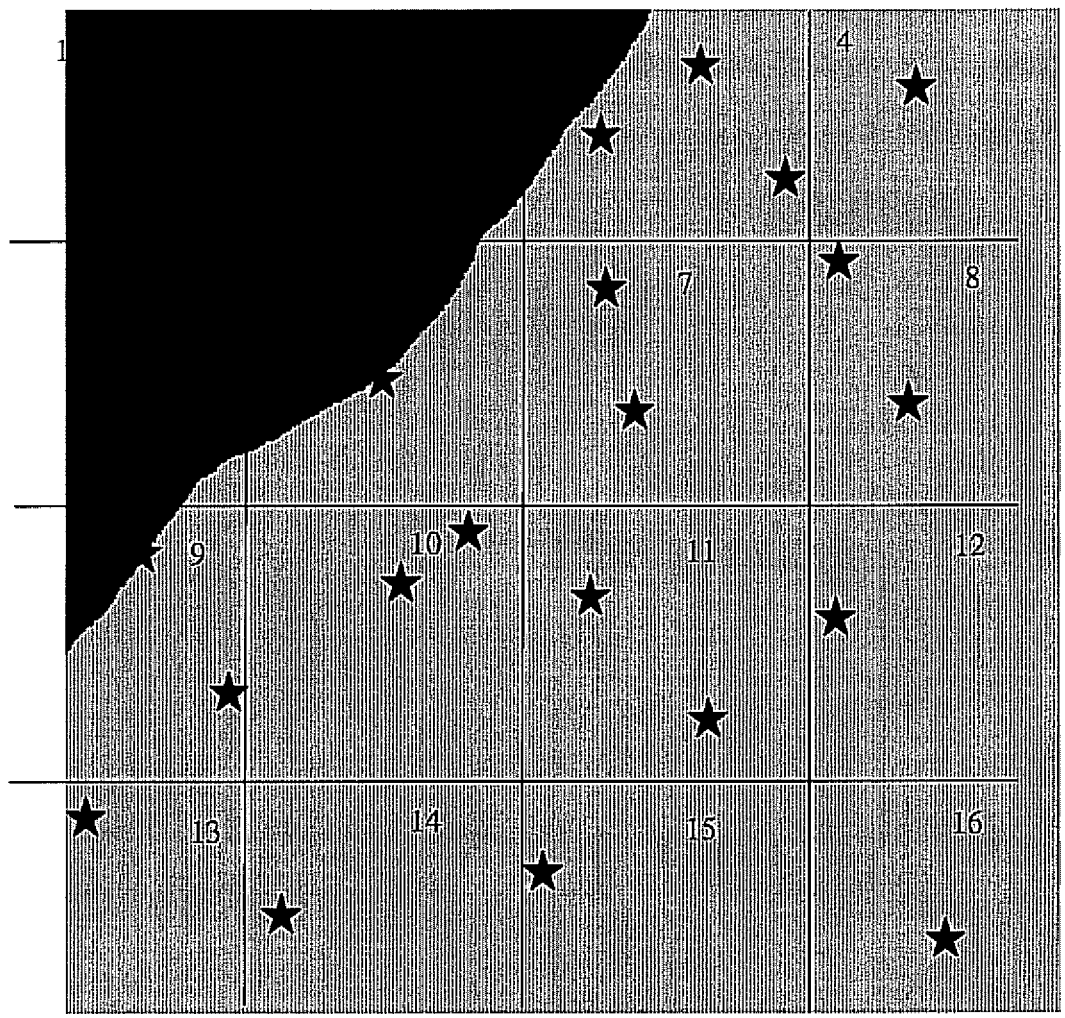
FIG. 4 shows the map of FIG. 3 divided into tiles.

Reference is now made to the drawings, which illustrate one preferred search method according to the invention. In FIG. 1, a user has requested the locations of nearby fast food restaurants. Route distances to the restaurants are added to the current route, and are displayed as shown. In FIG. 2, the user has selected a McDonald's, and a route is provided that includes both the original and the new destination. FIG. 3 shows a map with locations that meet certain criteria, possibly fast-food restaurants. In FIG. 4, the map is divided into tiles numbered 1-16.

Figure 5:
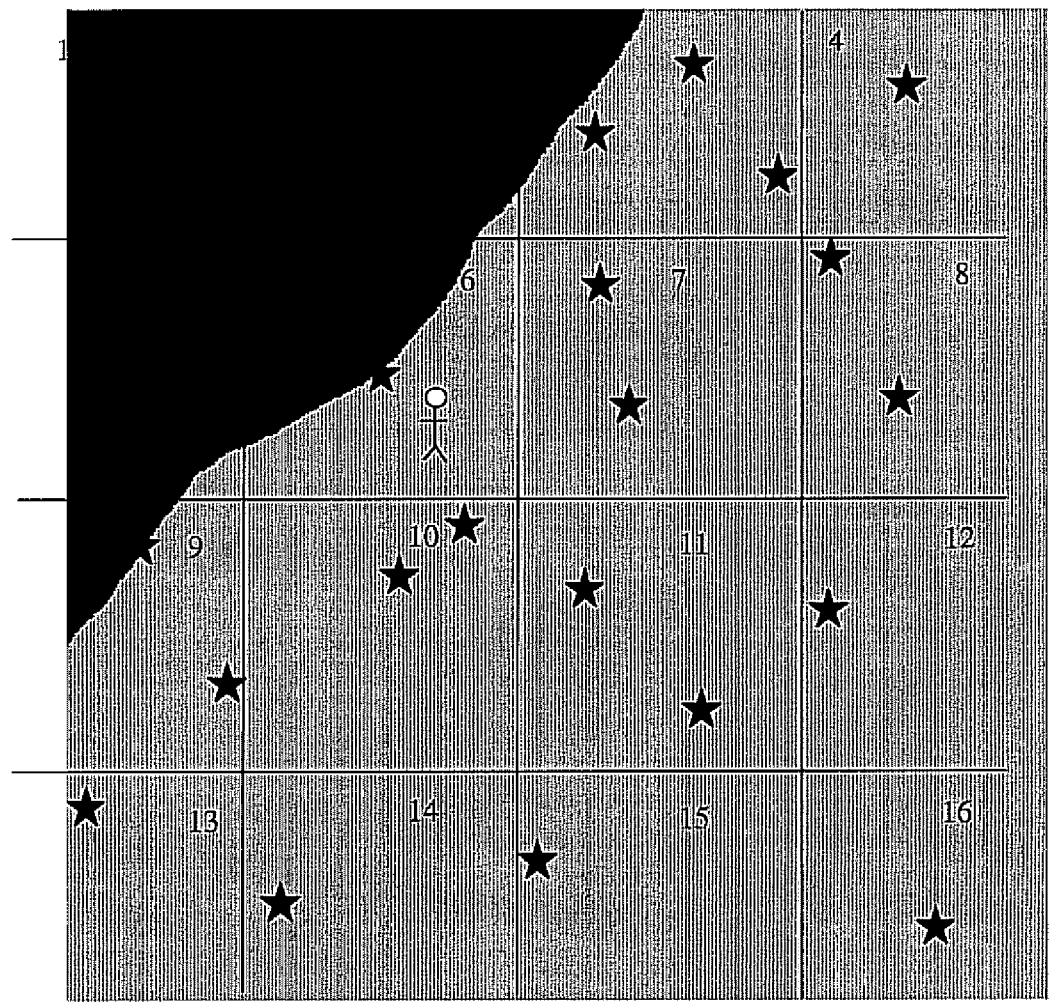
FIG. 5 shows selection of a starting point for a destination search.
Figure 6:
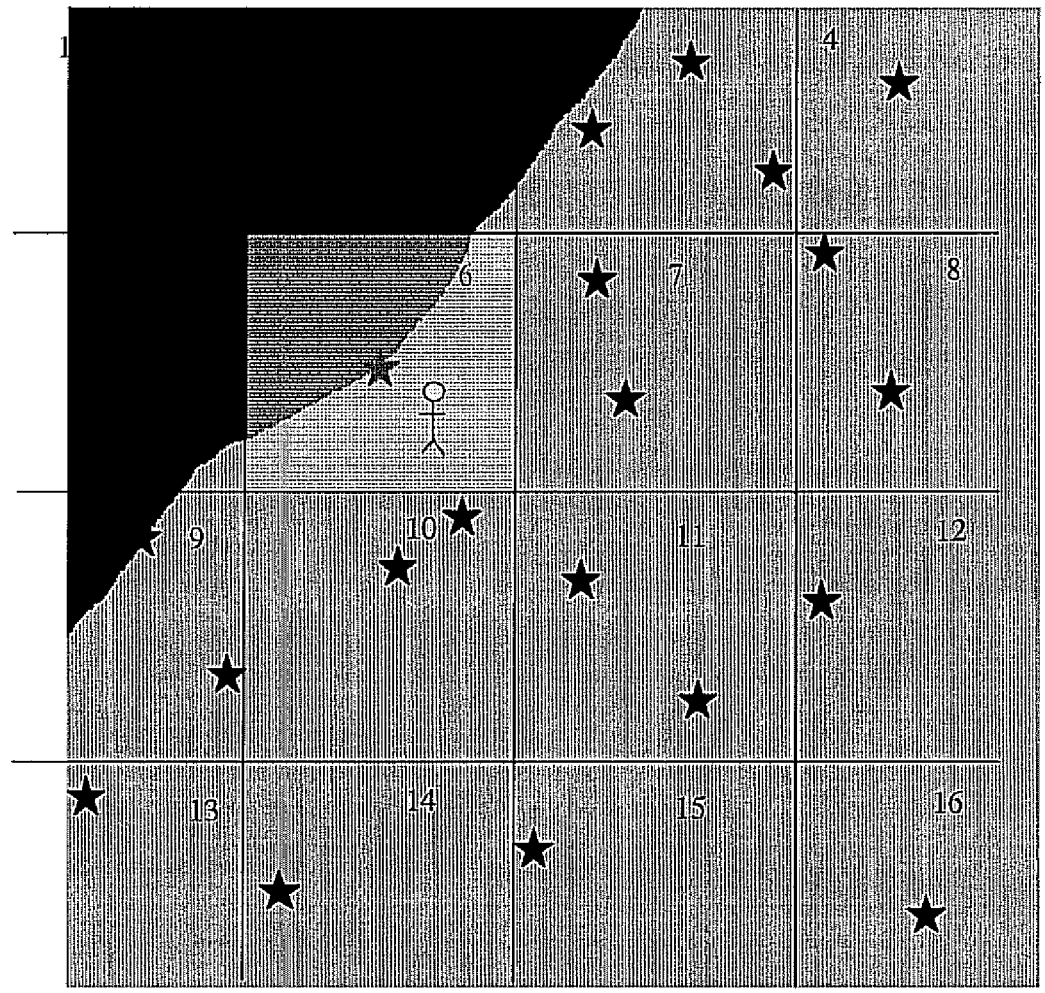
FIG. 6 shows the first step of the destination search.
Figure 7:
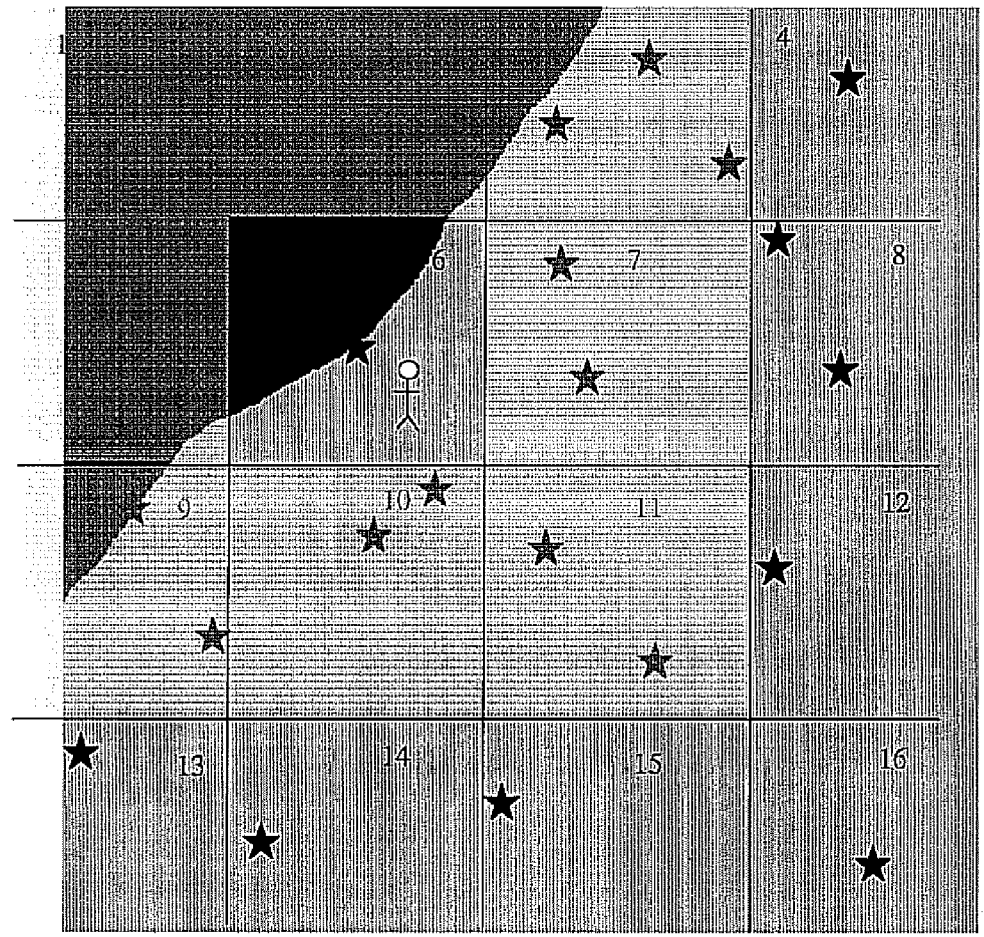
FIG. 7 shows a continuation of the destination search.
Figure 8:
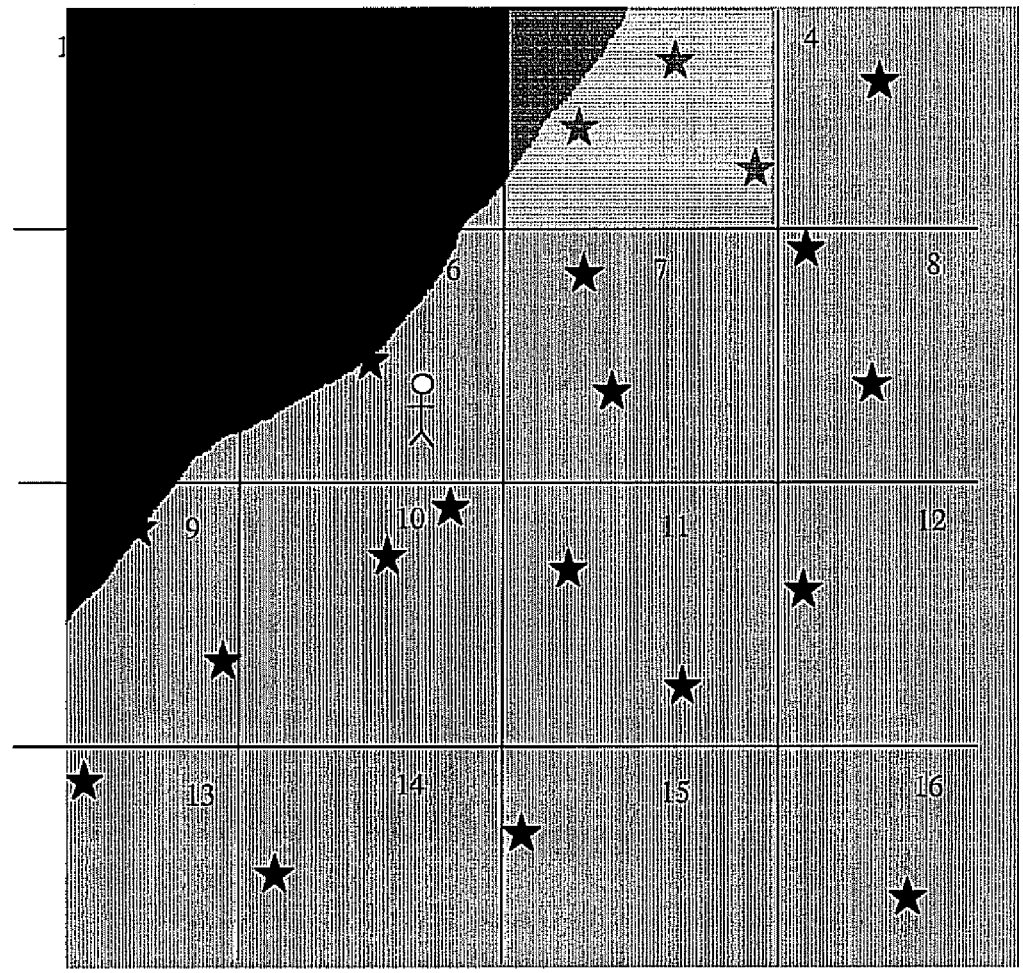
FIG. 8 shows a further continuation of the destination search.
Figure 9:
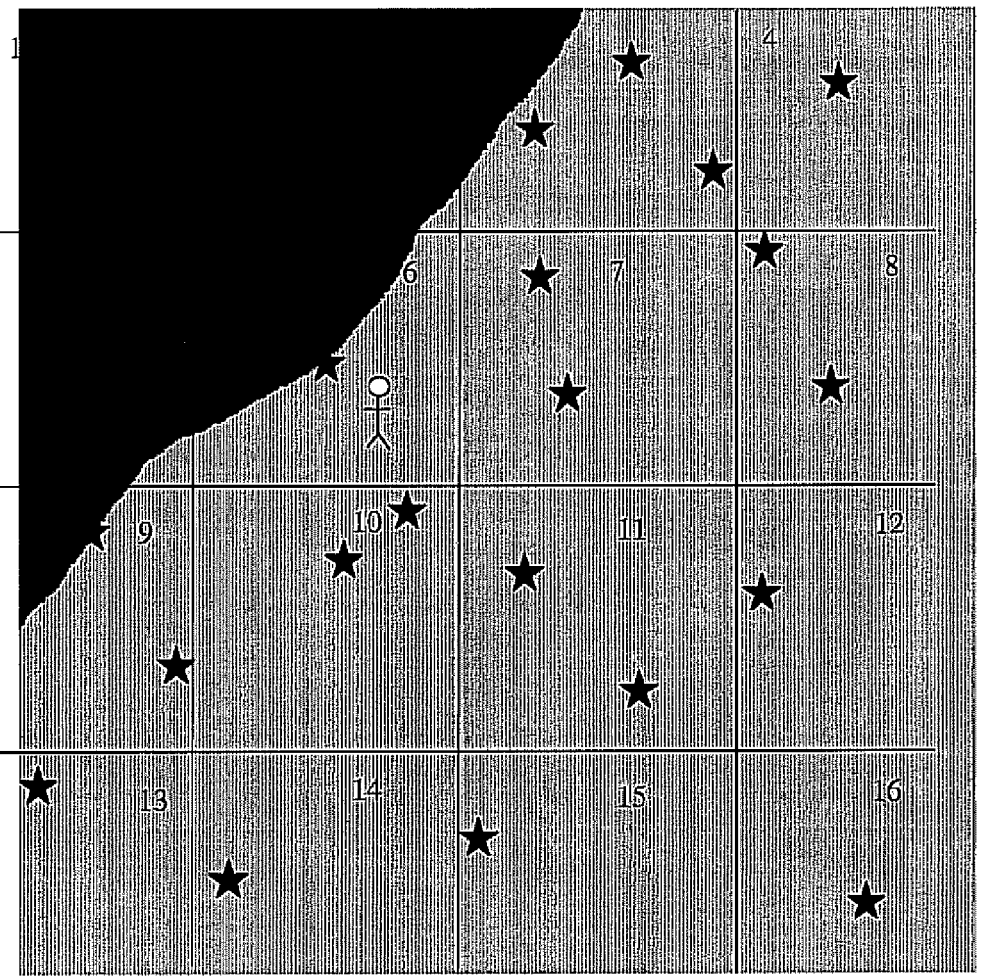
FIG. 9 shows a destination search completed.

In FIG. 5, a user is in tile 6, and wishes to find at least the five closest locations meeting the criteria. Tile six is checked first, producing one matching location (FIG. 6). Since the requested number of matching locations has not yet been found, the tiles adjoining tile 6 are searched in FIG. 7, still producing only one candidate. In FIG. 8, however, tile 3 is searched, producing 3 matches. Finally, in FIG. 9, the adjoining tiles are further checked (i.e., 7, 11, 10, 9, 5, 1, 2) producing a total of 12 matching locations. If the number of locations found is greater than the number of locations requested, the search ends.

This invention is of particular use in a wireless client-server (WCS) navigator because it offers a way of searching for nearby location with very few computations, reducing the amount of time required to perform a search. This, in turn, reduces the number of servers that must be used to accommodate a given number of customers, and hence the operating cost of the navigator.

It is also of particular use in a wireless client-server navigator because the wireless client-server navigation architecture allows the navigator to access very large databases of locations which may be searched, as opposed to standalone navigators, in which such databases are typically smaller due to the cost of storing data onboard.

I claim:

1. A wireless client-server navigation system, comprising:
    a mobile unit including:
        a wireless transmitter for transmitting data representative of a criteria for selection of a location, data representing a route, and a request for data representative of a location,
        a receiver for receiving the data representative of the location and associated data, and
        a user interface for presenting representations of locations representations of additional time or distance to be added to a route if locations are added to said route; and
    a central server including:
        an input for receiving data describing map-related features in the form of line segments interconnecting points having coordinates,
        a receiver for receiving the data, route, and request from the mobile unit,
        a processor for searching a database of locations according to said criteria and computing additional distance and time if locations are added to said route; and
        a transmitter for transmitting data representative of locations matching said criteria and associated data and data representative of additional distance and time to the mobile unit.

2. A wireless client-server navigation system, comprising:
    a mobile unit including:
        a wireless transmitter for transmitting data representative of a criteria for selection of a location, data representing a route, and a request for data representative of a location,
        a receiver for receiving the data representative of the location and associated data, and
        a user interface for presenting representations of locations and representative of a route; and
    a central server including:
        an input for receiving data describing map-related features in the form of line segments interconnecting points having coordinates,
        a receiver for receiving the data, route, and request from the mobile unit,
        a processor for searching a database of locations according to said criteria and amending said route to include one or more locations matching said criteria; and
        a transmitter for transmitting data representative of locations matching said criteria and associated data and data representative of an amended route.

* * * * *